(12) United States Patent
Suga et al.

(10) Patent No.: US 6,516,407 B1
(45) Date of Patent: Feb. 4, 2003

(54) INFORMATION PROCESSOR

(75) Inventors: Atsuhiro Suga, Kawasaki (JP); Toshihiro Ozawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/473,046

(22) Filed: Dec. 28, 1999

(30) Foreign Application Priority Data

Dec. 28, 1998 (JP) .............................. 10-374415

(51) Int. Cl.⁷ .............................. G06F 9/30; G06F 9/42
(52) U.S. Cl. .................. 712/226; 712/245; 712/234; 712/24
(58) Field of Search ................. 712/236, 226, 712/228, 245, 213, 240, 234, 246, 207, 24

(56) References Cited

U.S. PATENT DOCUMENTS 4,821,187 A  4/1989  Ueda et al. .................. 712/246
6,055,621 A  4/2000  Puzak ........................ 712/207

*Primary Examiner*—Daniel H. Pan
(74) *Attorney, Agent, or Firm*—Staas & Halsey LLP

(57) ABSTRACT

To an existing instruction set, newly added are a condition code conversion instruction for converting a first condition code (N, Z, OV, C) to a second condition code (V, S) based on a reference condition code COND, a second conditional instruction having a reference flag SF, and an instruction of operation between two selected second condition codes. A VLIW processor comprises a second condition code register file 163, a condition code conversion circuit 12A, and a logic operation circuit 12E for performing a non-Boolean logic operation between two selected second condition codes.

17 Claims, 24 Drawing Sheets

FIG.6

2ND CONDITION CODE

V   S

| 1 | 1 | TRUE

| 1 | 0 | FALSE

| 0 | 1 |
| 0 | 0 | } UNDEFINED

FIG.7

| STEP | SLOT 0 | SLOT 1 | SLOT 2 | SLOT 3 |
|---|---|---|---|---|
| 1 | SUBCC | NOP | NOP | NOP |
| 2 | B | NOP | NOP | NOP |
| 3 | LD | LD | NOP | NOP |
| 4 | ADD | B | NOP | NOP |
| 5 | LD | LD | NOP | NOP |
| 6 | SUB | NOP | NOP | NOP |

FIG.8

| STEP | SLOT 0 | SLOT 1 | SLOT 2 | SLOT 3 |
|---|---|---|---|---|
| 1 | SUBCC | NOP | NOP | NOP |
| 2 | CKICC | NOP | NOP | NOP |
| 3 | CLD | CLD | CLD | CLD |
| 4 | CADD | CSUB | NOP | NOP |

FIG.9(A)

ANDCR

| RS1 \ RS2 | T | F | U |
|---|---|---|---|
| T | T | F | U |
| F | U | U | U |
| U | U | U | U |

FIG.9(B)

ORCR

| RS1 \ RS2 | T | F | U |
|---|---|---|---|
| T | T | T | T |
| F | T | F | F |
| U | T | F | U |

FIG.9(C)

XORCR

| RS1 \ RS2 | T | F | U |
|---|---|---|---|
| T | F | T | U |
| F | T | F | U |
| U | U | U | U |

FIG.9(D)

NOTCR

| RS1 | |
|---|---|
| T | F |
| F | T |
| U | U |

FIG.10(A)

ANDNCR

| RS1 \ RS2 | T | F | U |
|---|---|---|---|
| T | U | U | U |
| F | T | F | U |
| U | U | U | U |

FIG.10(B)

ORNCR

| RS1 \ RS2 | T | F | U |
|---|---|---|---|
| T | T | F | F |
| F | T | T | T |
| U | F | T | U |

FIG.10(C)

XORNCR

| RS1 \ RS2 | T | F | U |
|---|---|---|---|
| T | T | F | U |
| F | F | T | U |
| U | U | U | U |

FIG.11(A)

NANDCR

| RS1 \ RS2 | T | F | U |
|---|---|---|---|
| T | F | T | U |
| F | U | U | U |
| U | U | U | U |

FIG.11(B)

NORCR

| RS1 \ RS2 | T | F | U |
|---|---|---|---|
| T | F | F | F |
| F | F | T | T |
| U | F | T | U |

FIG.11(C)

NXORCR

| RS1 \ RS2 | T | F | U |
|---|---|---|---|
| T | T | F | U |
| F | F | T | U |
| U | U | U | U |

FIG.12(A)

NANDNCR

| RS1 \ RS2 | T | F | U |
|---|---|---|---|
| T | U | U | U |
| F | F | T | U |
| U | U | U | U |

FIG.12(B)

NORNCR

| RS1 \ RS2 | T | F | U |
|---|---|---|---|
| T | F | T | T |
| F | F | F | F |
| U | F | T | U |

FIG.12(C)

NXORNCR

| RS1 \ RS2 | T | F | U |
|---|---|---|---|
| T | F | T | U |
| F | T | F | U |
| U | U | U | U |

FIG.17

| STEP | SLOT 0 | SLOT 1 | SLOT 2 | SLOT 3 |
|---|---|---|---|---|
| 1 | SUBCC R10 R11 R12 CC6 | SUBCC R1 R2 R3 CC1 | SUBCC R4 R5 R6 CC2 | NOP |
| 2 | CKICC BL CC6 | CKICC BL CC1 | CKICC BG CC2 | NOP |
| 3 | CUDIV R20 R21 R22 CR1T | ANDNCR CR1 CR2 CR2 | NOP | NOP |
| 4 | CSUB R7 R8 R9 CR2T | ORCR CR2 CR6 CR5 | CADD R7 R8 R9 CR2F | NOP |
| 5 | CMUL R7 R8 R12 CR5T | NOP | NOP | NOP |

FIG.18

| STEP | SLOT 0 | SLOT 1 | SLOT 2 | SLOT 3 |
|---|---|---|---|---|
| 1 | SUBCC R10 R11 R12 CC6 | NOP | NOP | NOP |
| 2 | BICC BL CR6 L2 | BA L4 | NOP | NOP |
| 3 | SUBCC R1 R2 R3 C1 | NOP | NOP | NOP |
| 4 | BICC BL CR1 L3 | NOP | NOP | NOP |
| 5 | SUBCC R4 R5 R6 C2 | NOP | NOP | NOP |
| 6 | BICC BG CR2 L2 | NOP | NOP | NOP |
| 7 | SUB R7 R8 R9 | NOP | NOP | NOP |
| 8 | MUL R7 R8 R9 | BA L4 | NOP | NOP |
| 9 | ADD R7 R8 R9 | NOP | NOP | NOP |
| 10 | UDIV R20 R21 R22 | NOP | NOP | NOP |

FIG.22
prior art

| CONDITION CODE | MNEMONIC | MEANING | CONDITION TO BE JUDGED |
|---|---|---|---|
| 0000 | BN | Branch Never | 0 |
| 0001 | BCS | Branch on Carry Set | C |
| 0010 | BVS | Branch on Overflow Set | OV |
| 0011 | BL | Branch on Less | NxorOV |
| 0100 | BE | Branch on Equal | Z |
| 0101 | BLEU | Branch on Less or Equal Unsigned | CorZ |
| 0111 | BLE | Branch on Less or Equal | Zor(NxorOV) |
| 1000 | BA | Branch Always | 1 |
| 1001 | BCC | Branch on Carry Clear | notC |
| 1010 | BVC | Branch on Overflow Clear | notOV |
| 1011 | BGE | Branch on Greater or Equal | not(NxorOV) |
| 1100 | BNE | Branch on Not Equal | notZ |
| 1101 | BGU | Branch Greater Unsigned | not(CorZ) |
| 1110 | BPOS | Branch Positive | notN |
| 1111 | BG | Branch Greater | not(Zor(NxorOV)) |

FIG.23(A) prior art

| STEP | INSTRUCTION |
|------|-------------|
| 1 | I1 |
| 2 | I2 |
| 3 | BA 7 |
| 4 | I3 |
| 5 | I4 |
| 6 | I5 |
| 7 | BA 9 |
| 8 | I6 |
| 9 | I7 |

FIG.23(B) prior art

| STEP | SLOT 0 | SLOT 1 | SLOT 2 | SLOT 3 | SLOT 4 | SLOT 5 | SLOT 6 | SLOT 7 |
|------|--------|--------|--------|--------|--------|--------|--------|--------|
| 1 | I1 | I2 | BA | NOP | NOP | NOP | NOP | NOP |
| 2 | BA | NOP | NOP | NOP | NOP | NOP | NOP | NOP |
| 3 | I7 | | | | | | | |

FIG.24(A) prior art

| STEP | INSTRUCTION |
|------|-------------|
| 1 | I1 |
| 2 | I2 |
| 3 | CI3 |
| 4 | CI4 |
| 5 | CI5 |
| 6 | CI6 |
| 7 | CI7 |

FIG.24(B) prior art

| STEP | SLOT 0 | SLOT 1 | SLOT 2 | SLOT 3 | SLOT 4 | SLOT 5 | SLOT 6 | SLOT 7 |
|------|--------|--------|--------|--------|--------|--------|--------|--------|
| 1 | I1 | I2 | CI3 | CI4 | CI5 | CI6 | CI7 | NOP |

INFORMATION PROCESSOR

BACKGROUND OF THE INVENTION

1. Field of the Invention

The present invention relates generally to an information processor, more particularly, to a VLIW processor comprising a plurality of processing units.

2. Description of the Related Art

FIG. 21 shows a relation between an instruction format of an operation with the function of a condition code generation and a schematic hardware structure for executing the instruction.

An operation code OP of the instruction is decoded, thereby a kind of operation that ALU 124 performs is determined and the following control is performed in order to perform the operation. That is, the code signals from a first source operand RS1 and a second source operand RS2 of the instruction, or decoded signals thereof are provided to the respective selection control inputs of selectors 125 and 126 and thereby, contents of registers selected in a general register file 161 are provided to ALU 124. The code signal from a destination operand RD of the instruction or a decoded signal thereof is provided to the control input of a demultiplexer 127, thereby one register in the general register file 161 is designated and an operation's result of the ALU 124 is stored into the register.

On the other hand, the code signal from an ID code CCi in the instruction, indicating a first condition code register, or a decoded signal thereof is provided to a control input of a demultiplexer 128, thereby one of registers CC0 to CC7 of a first condition code register file 162 is designated and a condition code determined by the operation's result of ALU 124 is stored into the designated register. The condition code has a negative flag N, a zero flag Z, an overflow flag OV and a carry flag C. The operation is an arithmetic operation or a logic operation. A branch instruction is used to execute a branch when a condition code meets a predetermined condition.

FIG. 22 shows condition code in a branch instruction, mnemonic thereof, meaning thereof and condition to be judged. For example, when the code in the condition field is '0100,' if the zero flag of the condition code is '1,' then the condition is judged to be satisfied and a branch is executed, while if Z='0,' then the condition is judged to be not satisfied and the branch is not executed.

In a program shown in FIG. 23(A), I1 to I7 are instructions other than branch instruction, an unconditional branch instruction BA 7 is executed at step 3 and an unconditional branch instruction BA 9 is executed at step 7. Therefore, instructions I1, I2, BA 7, BA 9 and I7 are executed in this order sequentially.

In a case where the program is run on a VLIW processor comprising a plurality of parallel processing units, each of the packets of steps 1 to 3 shown in FIG. 23(B) is made to be one VLIW instruction by an instruction scheduler. Each instruction packet can include only one branch instruction at most, and many of NOP instructions are inserted therein, so that a parallel processing efficiency is deteriorated. In general, it is said that a branch instruction is encountered in a ratio of one in five.

In order to improve such circumstances, a proposal has been made of the predicated execution technique ("HPL PlayDoh Architecture Specification: Ver. 1.0" Vinod Kathail, Etc. HPL-93-80 February 1994, "Incorporated Guarded Execution into Existing Instruction Set" D. N. Pnevmatikatos PDH Paper Wisconsin Univ. 1996, and "The Benefit of Predicated Execution for Software Pipelining" N. J. Water, etc. HISCC-26 Conference Proceedings January 1993 Vol. 1, pp 497–606) in which no branch instruction is adopted and a conditional instruction is introduced instead.

For example in a case of FIG. 23(A), branch instructions of steps 3 and 7 are omitted, I3 to I5 of steps 4 to 6 are replaced with conditional instructions C13 to C17, I6 and I7 of steps 8 and 9 are replaced with conditional instructions C16 and C17, and a program as shown in FIG. 24 (A) is constructed. Of the conditional instructions C13 to C17, only the conditional instruction C17 is actually executed with satisfying the condition. When the program runs on a VLIW processor, only one instruction packet is needed as shown in FIG. 24(B) and thereby, NOP instructions becomes few, which improves a parallel processing efficiency.

However, there arise the following problems in the predicated execution technique.

(1) An existing conditional branch instruction includes a condition field with a plurality of bits as shown in FIG. 22, and for example, when the bits is '0011,' it is judged whether the exclusive OR (xor) of a negative flag N and an valid flag V thereof is '1' or '0.' In contrast, in the predicated execution technique, since it is judged whether or not an operation is executed depending on a value of only one flag without performing an operation between flags, another set of instructions instead of the existing one have to be adopted, thereby making existing software resources impossible to be used as they are.

(2) When the predicated execution technique is realized with a conditional instruction having a condition field of a plurality of bits such as that shown in FIG. 22, an instruction scheduler becomes complex, which makes the technique hard to be realized since it is decided whether or not the instruction is executed after an operation that is shown in the condition to be judged in FIG. 22 is performed.

(3) Since a conditional instruction of the predicated execution technique focuses attention only on whether or not one condition is satisfied, a prior art conditional branch instruction also has to be employed together in a case of multiple conditions is used and NOP instructions are increased in number as described above, thereby a parallel processing efficiency is worsened.

SUMMARY OF THE INVENTION

Accordingly, it is an object of the present invention to provide an information processor that not only can inherit an existing instruction set architecture, but also can employ an instruction of predicated execution technique.

It is another object of the present invention to provide a information processor that can employ a conditional instruction of predicated execution technique instead of a prior art conditional branch instruction with multiple condition.

In the present invention, there is provided an information processor comprising: an instruction register for storing a fetched instruction, the instruction being one of instructions including an operational instruction with a function of generating a first condition code, a condition code conversion instruction having a reference condition code, a conditional instruction having a reference flag; an instruction decoder for decoding an instruction stored in the instruction register; a control circuit for performing a control to execute the stored instruction in response to a decoded result; a first condition code register; a second condition code register; and a condition code conversion circuit for converting contents of the first condition code register into a second condition code depending on the reference condition code, the second condition code having a condition flag, wherein the control circuit makes the generated first condition code stored into the first condition code register in response to a decoded result of the operational instruction, makes the converted second condition code stored into the second condition code register in response to a decoded result of the condition code conversion instruction, and performs a control to execute an operation of the conditional instruction in response to a decoded result of the conditional instruction only when the reference flag coincide with the condition flag in the second condition code register.

With the present invention, since not only an instruction set including a prior art operational instruction with a condition code generation function can be employed, but also a second conditional instruction that is of a predicated execution function can also be employed, a processing performance can be improved while program resources in the past are effectively utilized.

Other aspects, objects, and the advantages of the present invention will become apparent from the following detailed description taken in connection with the accompanying drawings.

BRIEF DESCRIPTION OF THE DRAWINGS

FIG. 6 is an illustration showing second condition codes and respective meaning thereof;

FIG. 7 is a table showing an instruction sequence used for executing the first program described in the present specification on a 4 parallel VLIW processor;

FIG. 8 is a table showing an instruction sequence used for executing the second program described in the present specification on a 4 parallel VLIW processor;

FIGS. 9(A) to 9(D) each are truth tables of a logic operation between second condition codes;

FIGS. 10(A) to 10(C) each are truth tables of a logic operation between second condition codes;

FIGS. 11(A) to 11(C) each are truth tables of a logic operation between second condition codes;

FIGS. 12(A) to 12(C) each are truth tables of a logic operation between second condition codes;

FIG. 17 is a table showing a VLIW instruction sequence used for executing the third program described in the present specification on a 4 parallel VLIW processor;

FIG. 18 is a table showing a VLIW instruction sequence used for executing a program described with using a prior art instruction set including a branch instruction on a 4 parallel VLIW processor;

FIG. 22 is a table, of a prior art, showing condition code in a branch instruction, and their mnemonic, meaning and condition to be judged;

FIG. 23(A) is a table showing a program including a prior art branch instruction;

FIG. 23(B) is a table showing a VLIW instruction sequence when the program of FIG. 23(A) is executed on a 7 parallel processor;

FIG. 24(A) is a table showing a program obtained by replacing instructions in FIG. 23(A) with second conditional instructions; and FIG. 24(B) is a table showing a VLIW instruction sequence when the program of FIG. 24(A) is executed on a 7 parallel VLIW processor.

DESCRIPTION OF THE PREFERRED EMBODIMENTS

Figure 1:
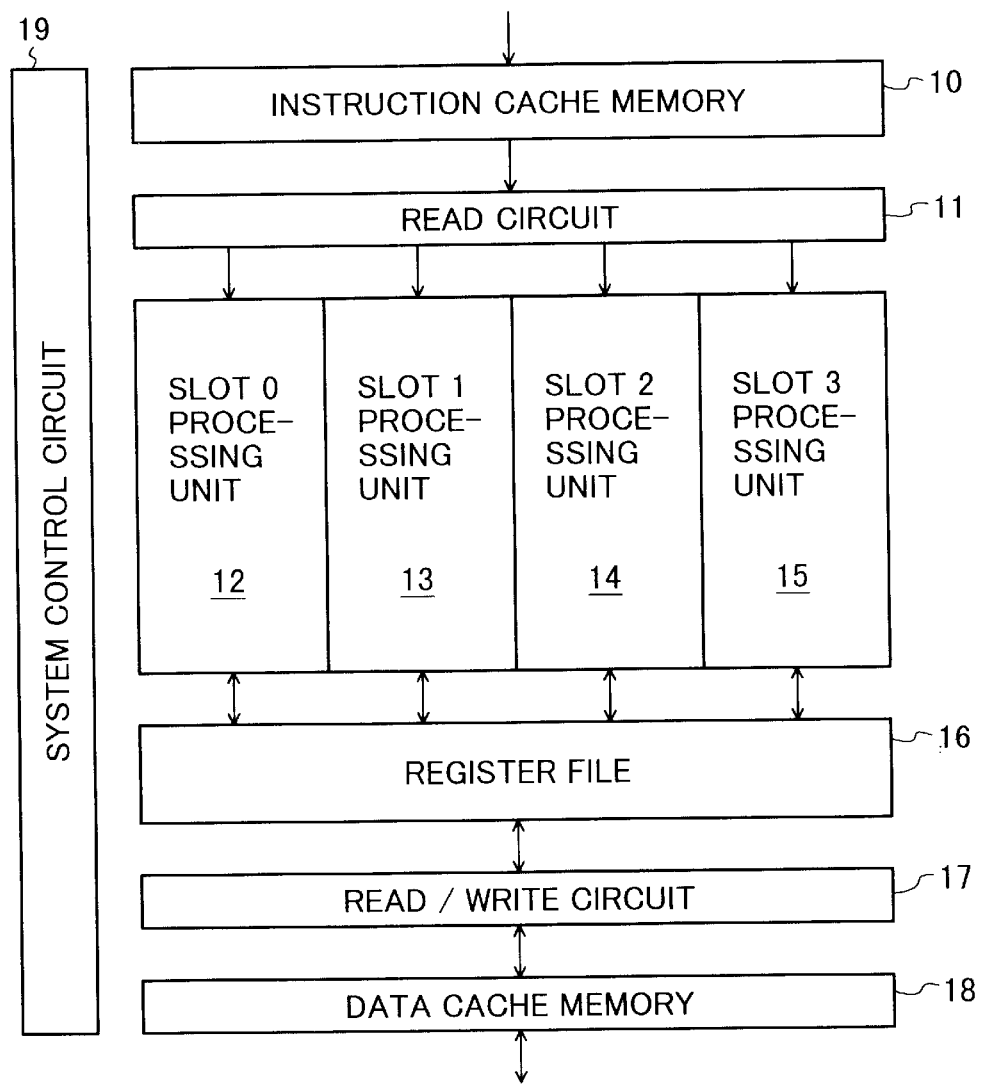
FIG. 1 is a schematic block diagram showing a VLIW processor to which the present invention is applied.

Referring now to the drawings, wherein like reference characters designate like or corresponding parts throughout several views, preferred embodiments of the present invention are described below.

FIG. 1 is a schematic block diagram showing a VLIW processor to which the present invention is applied.

In an instruction cache memory 10, instructions arranged by an instruction scheduler are stored and instructions are provided through a read circuit 11 to processing units 12 to 15 of slots 0 to 3 that are of the same configuration to each other, and general registers and condition code registers in a register file 16 are used in parallel processing of each instruction pack. Contents of general registers in the register file 16 are stored through a read/write circuit 17 into a data cache memory 18 in response to execution of a store instruction and data in the data cache memory 18 are stored into registers in the register file 16 through the read/write circuit 17 in response to execution of a load instruction. Control of the entire system is performed by a system control circuit 19.

Figure 2:
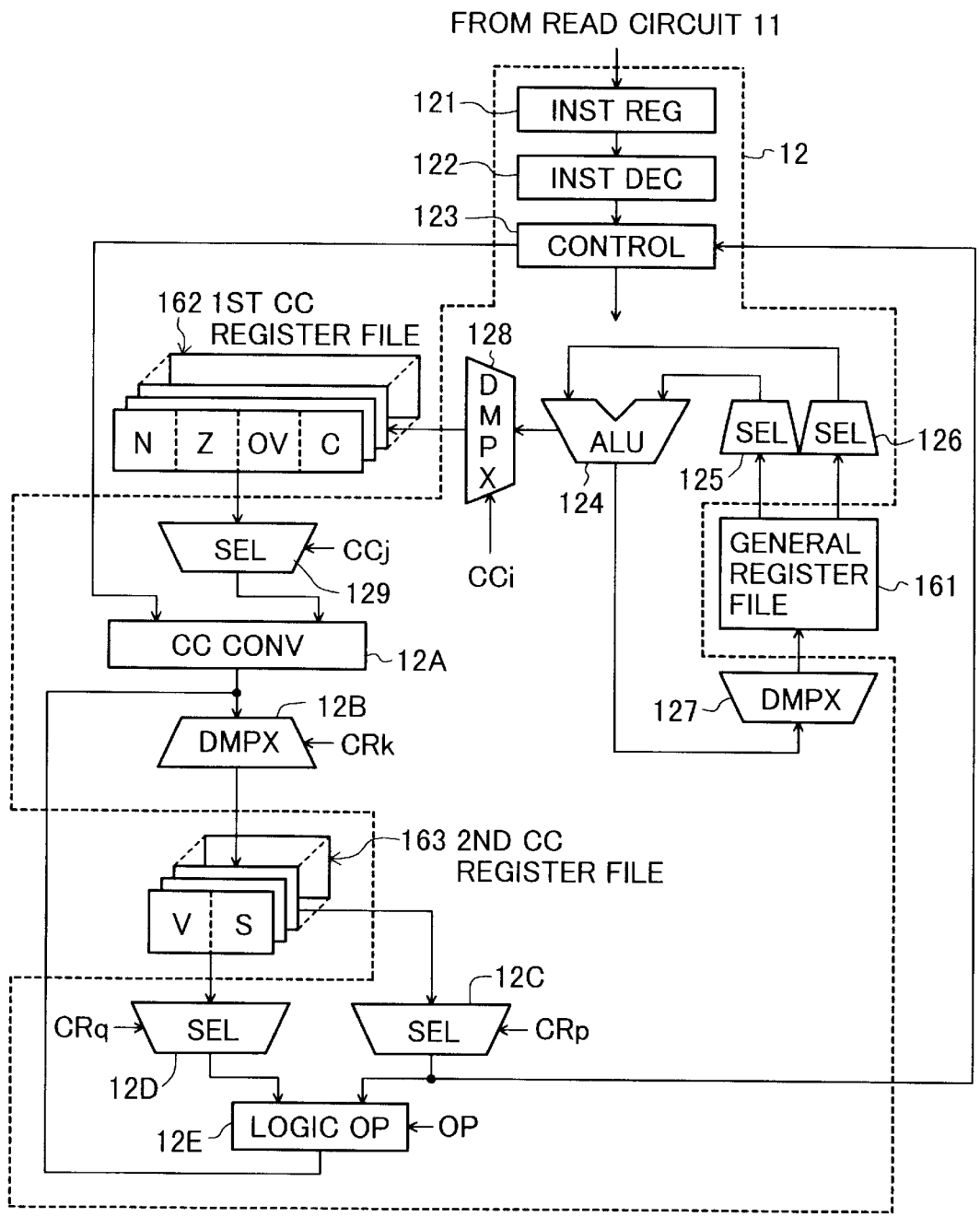
FIG. 2 is a schematic block diagram showing a configuration of a slot 0 processing unit in FIG. 1.

FIG. 2 is a schematic block diagram showing a configuration of the processing unit 12 of slot 0.

Figure 21:
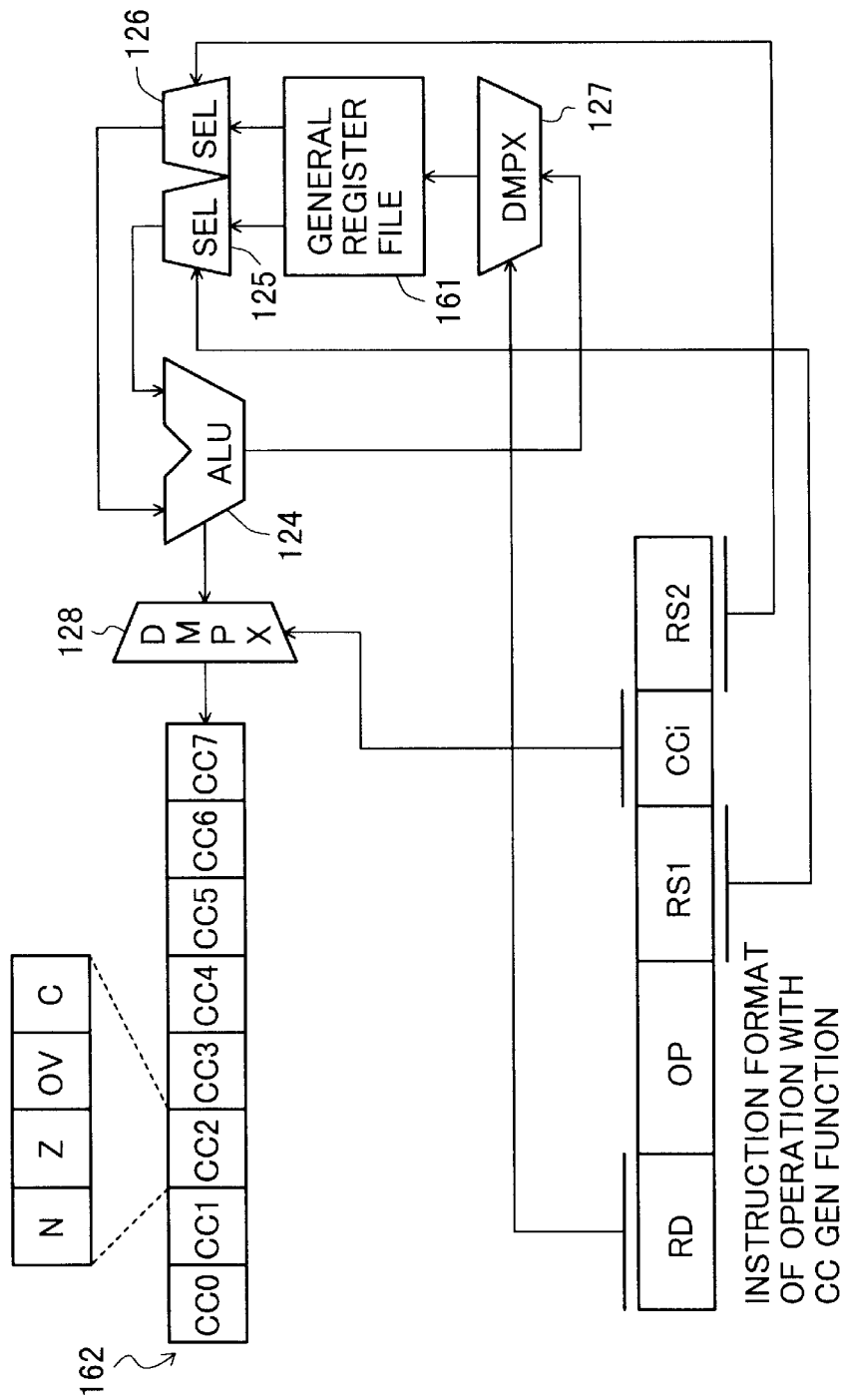
FIG. 21 is an illustration showing a relation, of a prior art, between an instruction format of an operation with the function of a condition code generation and a schematic hardware structure for executing the instruction.

An instruction read out from the read circuit 11 is retained in an instruction register 121 and contents thereof are decoded by an instruction decoder 122. A control circuit 123 performs various kinds of control based on the decoded result to execute the instruction. The components 124 to 128 are same as those that are above described with reference to FIG. 21.

In this embodiment, not only existing software resources can be utilized as they are with inheriting a prior art instruction set including a branch instruction provided with a condition field that is shown in FIG. 22, but also conditional instructions each for performing operations only when designated conditions are satisfied can also be used. To realize this, the following configuration is added to a prior art VLIW processor. That is, the processor further comprises a selector 129 for selecting one register from the first condition code register file 162, a condition code conversion circuit 12A, a demultiplexer 12B, a second condition code register file 163, and selectors 12C and 12D each for selecting contents of designated registers from the second condition code register file 163, and further a condition code conversion instruction having the format as shown in FIG. 3 is newly added to the prior art instruction set.

Figure 3:
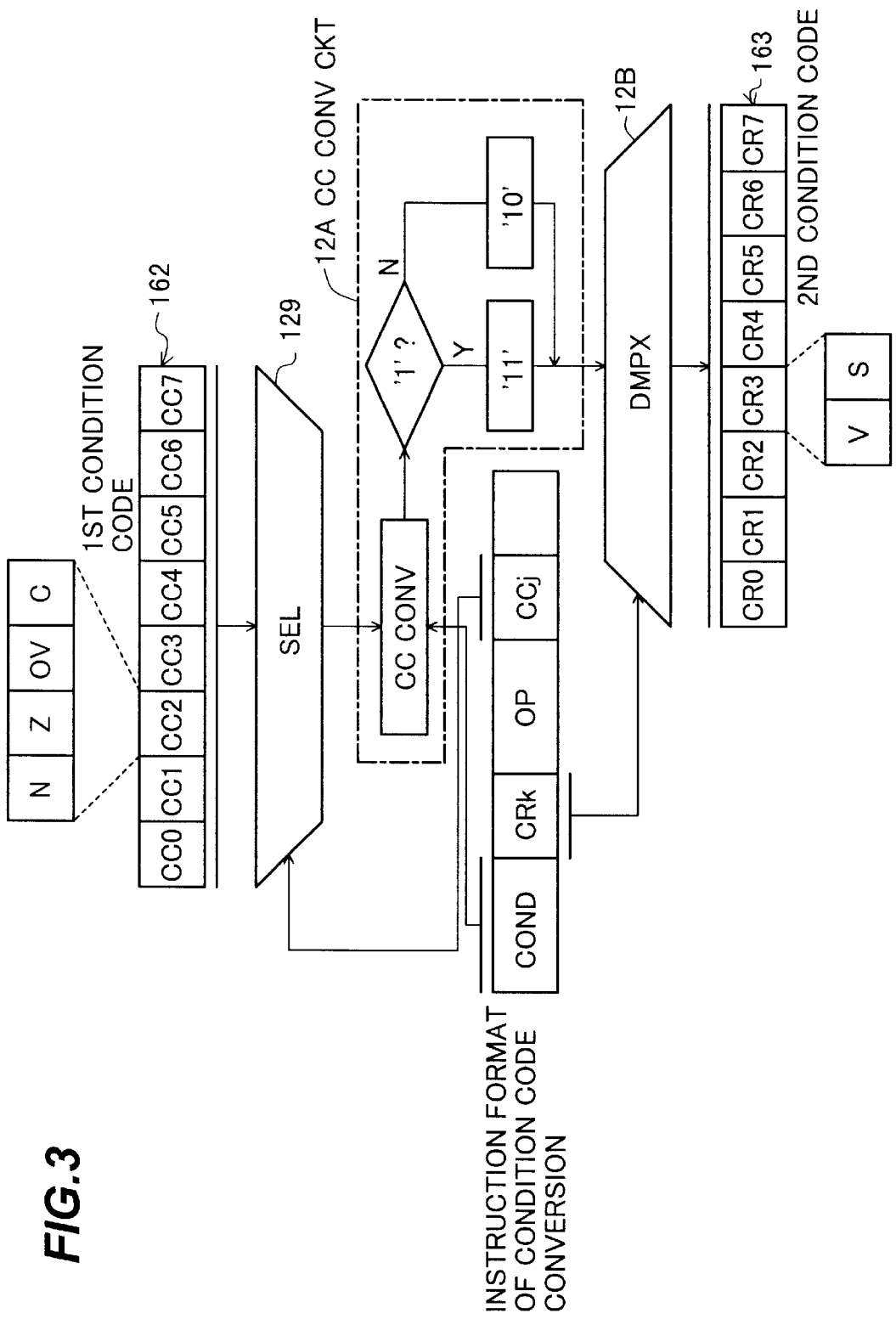
FIG. 3 is an illustration showing a relation between an instruction format of a condition code conversion and a schematic hardware structure for executing the instruction.

FIG. 3 shows a relation between an instruction format of a condition code conversion and a schematic hardware structure for executing the instruction. In FIG. 3, there is shown a case where the first condition code register file 162 consists of first condition code registers CC0 to CC7 and the second condition code register file 163 consists of second condition code registers CR0 to CR7.

Each of the first condition code registers CC0 to CC7 comprises a negative flag N, a zero flag Z, an over flow flag OV, and a carry flag C as described above. On the other hand, each of the second condition code registers CR0 to CR7 comprises an valid flag V and a condition flag S. The condition flag S is used for indicating a judgement result of a condition to be judged shown in FIG. 22 with 1 bit, and the judgment is performed in the condition code conversion circuit 12A. The valid flag V is introduced together with the condition flag S in order to express a multiple condition that will be described below. The valid flag V indicates VALID when it is '1' and INVALID when it is '0.' As a result of every condition code conversion, the valid flag V is set to '1.'

An ID code CCj in a condition code conversion instruction or a decoded signal thereof is provided to the control input of the selector 129 to select one of the first condition code registers of the first condition code register file 162, and the contents of the selected register are provided to the condition code conversion circuit 12A. A reference condition code COND in the instruction is same as one of the codes in the condition field of FIG. 22, and the code signal of COND or a decoded signal thereof is provided to the condition code conversion circuit 12A. The circuit 12A judges whether the contents of selected first condition code register satisfies the reference condition code COND. For example, when COND is '0011,' the circuit 12A operates the exclusive OR between the negative flag N and the valid flag V in the selected first condition code register. If the result of the exclusive OR is '1,' then the circuit 12A outputs '11', or else the circuit 12A outputs '10.'

An ID code CRk in the instruction or a decoded signal thereof is provided to the control input of a demultiplexer 12B, one of the second condition code registers of the second condition code register file 163 is designated and the output of the condition code conversion circuit 12A is stored into the designated register.

Figure 4:
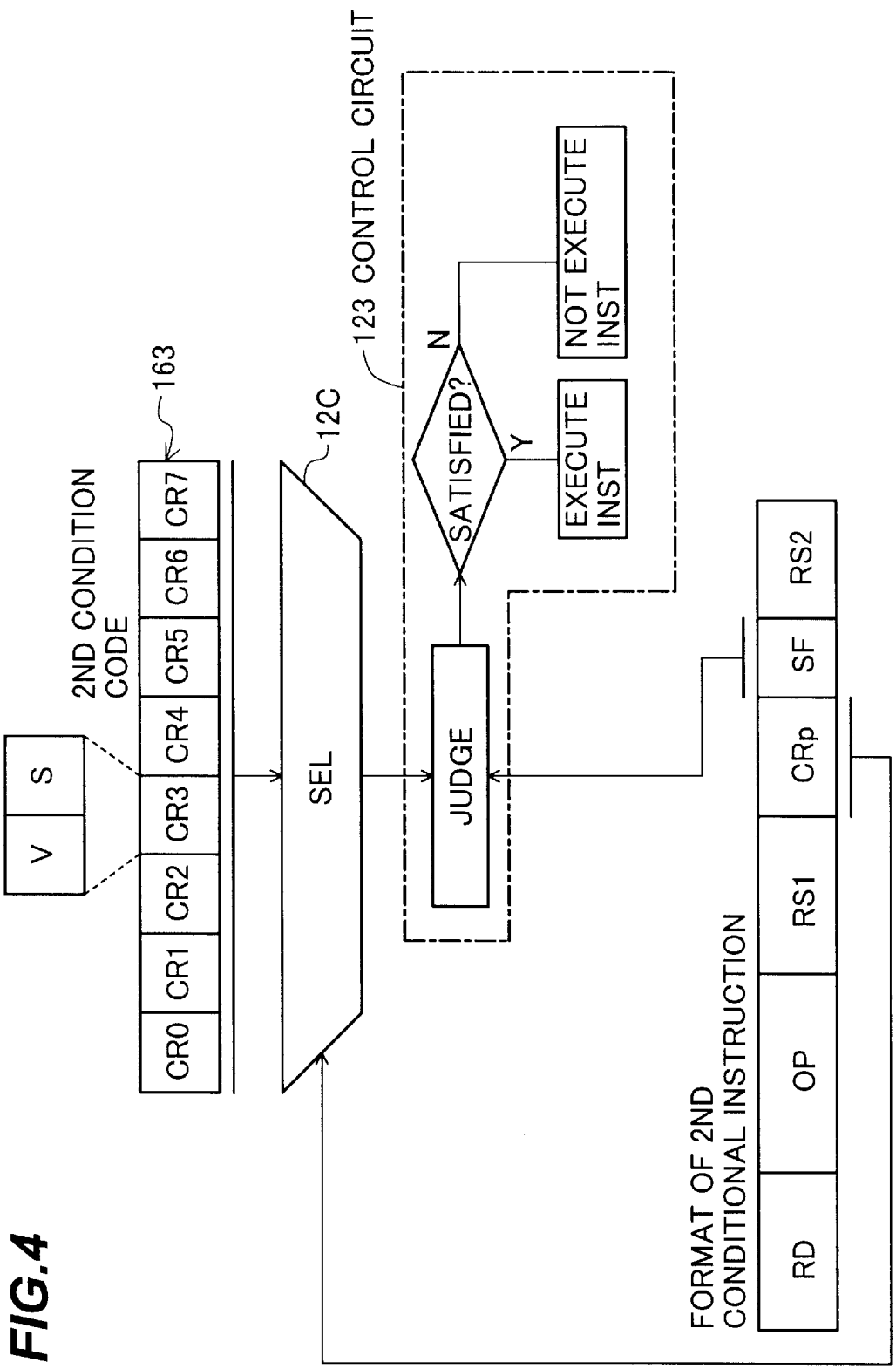
FIG. 4 is an illustration showing a relation between a format of a second conditional instruction, execution of which is decided depending on contents of a register designated in a second condition code register file, and a schematic hardware structure for executing the instruction.

FIG. 4 shows a relation between a format of a second conditional instruction, execution of which is decided depending on contents of a designated second condition code register in a second condition code register file 163, and a schematic hardware structure for executing the instruction.

The second conditional instructions include operational instructions, transfer instructions and others except branch instructions. An ID code CRp in the instruction or a decoded signal thereof is provided to the control input of a selector 12C to select one of the second condition code registers of the second condition code register file 163, and the contents of the selected register is provided to a control circuit 123. The control circuit 123 compares the value of the condition flag S in the selected second condition code register and the reference flag SF in the instruction, and if the valid flag V in the selected second condition code register is '1,' and if S and SF both coincide with each other, then an operation indicated by an operation code OP is executed, or else the operation is not executed. RS1, RS2 and RD in the instruction are a first source operand, a second source operand and a destination operand, respectively, regarding the operation indicated by the operation code OP.

Consider the following program as example.

If a condition R1>R2 holds, then:

$$R20=[R10+R13],$$

$$R21=[R10+R14],$$

and $$R22=R20-R21,$$

or else:

$$R20=[R10+R11],$$

$$R21=[R10+R12],$$

and $$R22=R20+R21.$$

Herein [ ] means indirect address, and for example, [R10+R13] is the contents of a memory whose address is a sum of the contents of the general registers R10 and R13.

The program is written as the following steps (1) to (10) in mnemonic of the machine language using a branch instruction:

(1) SUBCC R1 R2 R3 CC1

The tail characters CC in SUBCC indicate that the instruction is an operational instruction with a condition code generation function. This instruction means subtracting the contents of a general register R2 from the contents of a general register R1, namely performing (R1−R2), storing the result thereof into a general register R3, and setting N='1' if the result is negative, Z='1' if the result is zero, or C='1' if there arises a borrow, in the first condition code register CC1.

(2) BICC BG CC1 L1

BICC means a conditional branch instruction. This instruction means performing the logic operation of not (Z or (N xor OV)) in regard to the first condition code register CC1, and branching to a label L1 if the operation's result is '1.'

(3) LD R10 R11 R20

This instruction means loading data of [R10+R11] into a general register R20.

(4) LD R10 R12 R21

This instruction means loading data of [R10+R12] into a general register R21.

(5) ADD R20 R21 R22

This instruction means adding the contents of R20 and R21, namely performing (R20+R21), and storing the added result into a general register R22.

(6) BA L2

This instruction means branching to a label L2 unconditionally.

(7) L1 LD R10 R13 R20

This instruction means loading data of [R10+R13] into the general register R20. L1 is the label.

(8) LD R10 R14 R21

This instruction means loading data of [R10+R14] into the general register R21.

(9) SUB R20 R21 R22

This instruction means performing (R20−R21), and storing the result thereof into the general register R22.

(10) L2

L2 is the label.

FIG. 7 shows a VLIW instruction sequence to which the above program are arranged so that the program is executable in 4 parallel processes simultaneously, in order to check a parallel processing efficiency of the program.

Here, as shown in FIG. 6, definitions are made for the second condition code which comprises the valid flag V and condition flag S as follows:

The second condition code (V, S) is 'TRUE' if V='1' ('VALID') and S='1' ('TRUE').

The second condition code (V, S) is 'FALSE' if V='1' ('VALID') and S='0' ('FALSE').

The second condition code (V, S) is 'UNDEFINED' if V='0' ('INVALID') regardless of a value of the condition flag S.

Further, for example, CR1T designates that the second condition code register CR1 is 'TRUE', and CR1F designates that the second condition code register CR1 is 'FALSE'.

The above program including the instruction sequence and label (1) to (10) is rewritten as shown in the following instruction sequence and label (11) to (19) when using condition code conversion instructions and second conditional instructions without using a branch instructions:

(11) SUBCC R1 R2 R3 CC1

This is the same as the above instruction (1).

(12) CKICC BG CR1

CKICC means a condition conversion instruction. Contents (a first condition code) of the register designated by the ID code CCi of the first condition code register is converted to contents (a second condition code) of the register designated by the ID code CRi of the second condition code register, and description of the ID code CCi of the first condition code register is omitted from the instruction for simplification of description.

This instruction means performing the logic operation of not (Z or (N xor OV)) for the first condition code register CC1 and storing the result of the operation into the second code register CR1.

(13) CLD R10 R11 R20 CR1T

The head character C in CLD means that CLD is a second conditional instruction.

This instruction means loading data of [R10+R11] into the general register R20 in the case of CR1T.

(14) CLD R10 R12 R21 CR1T

This instruction means loading data of [R10+R12] into the general register R21 in the case of CR1T.

(15) CADD R20 R21 R22 CR1T

This instruction means, in the case of CR1T, performing (R20+R21) and storing the added result into a general register R22.

(16) L1 CLD R10 R13 R20 CR1F

This instruction means loading data of [R10+R13] into the general register R20 in the case of CR1F.

(17) CLD R10 R14 R21 CR1F

This instruction means loading data of [R10+R14] into the general register R21 in the case of CR1F.

(18) CSUB R20 R21 R22 CR1F

This instruction means, in the case of CR1F, performing (R20−R21) and storing the result thereof into the general register R22.

(19) L2

In this way, using a condition code conversion instruction, a second conditional instruction having a predicated execution function can be used while a prior art instruction set including an operational instruction with a condition code generation function is adopted. Hence, a parallel processing efficiency can be improved using a second conditional instruction while past program resources are kept in use.

FIG. 8 shows a VLIW instruction sequence to which the above program are arranged so that the program is executable on a 4 parallel VLIW processor, in order to check a parallel processing efficiency of the program.

As is apparent in comparison of FIG. 8 with FIG. 7, when a VLIW instruction sequence of the present invention is used, a parallel processing efficiency is improved, a program can be written with fewer VLIW instructions, and thereby a processing speed is increased.

Figure 13:
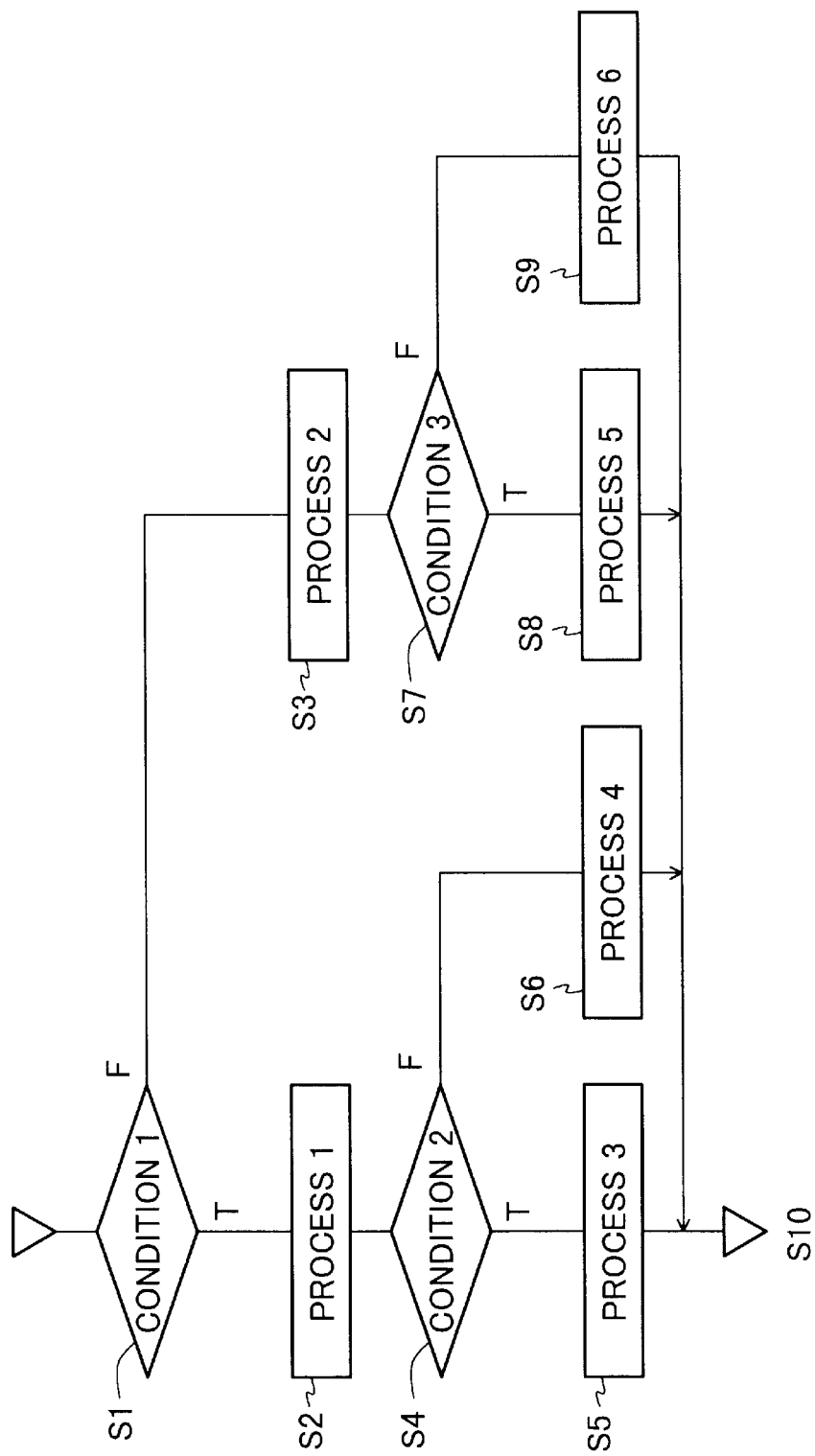
FIG. 13 is a flow chart showing a process divided into cases depending on conditions 1 to 3.

Next, a parallel processing efficiency will be considered when processing is performed under multiple conditions such that "condition 1" is satisfied but "condition 2" is not satisfied as shown in FIG. 13.

In order that such processing is executable using a second conditional instruction while not using a branch instruction, in FIG. 12, not only a selector 12D and a logic operation circuit 12E are further equipped but also an instruction of operation between second condition codes is newly added to express multiple conditions.

Figure 5:
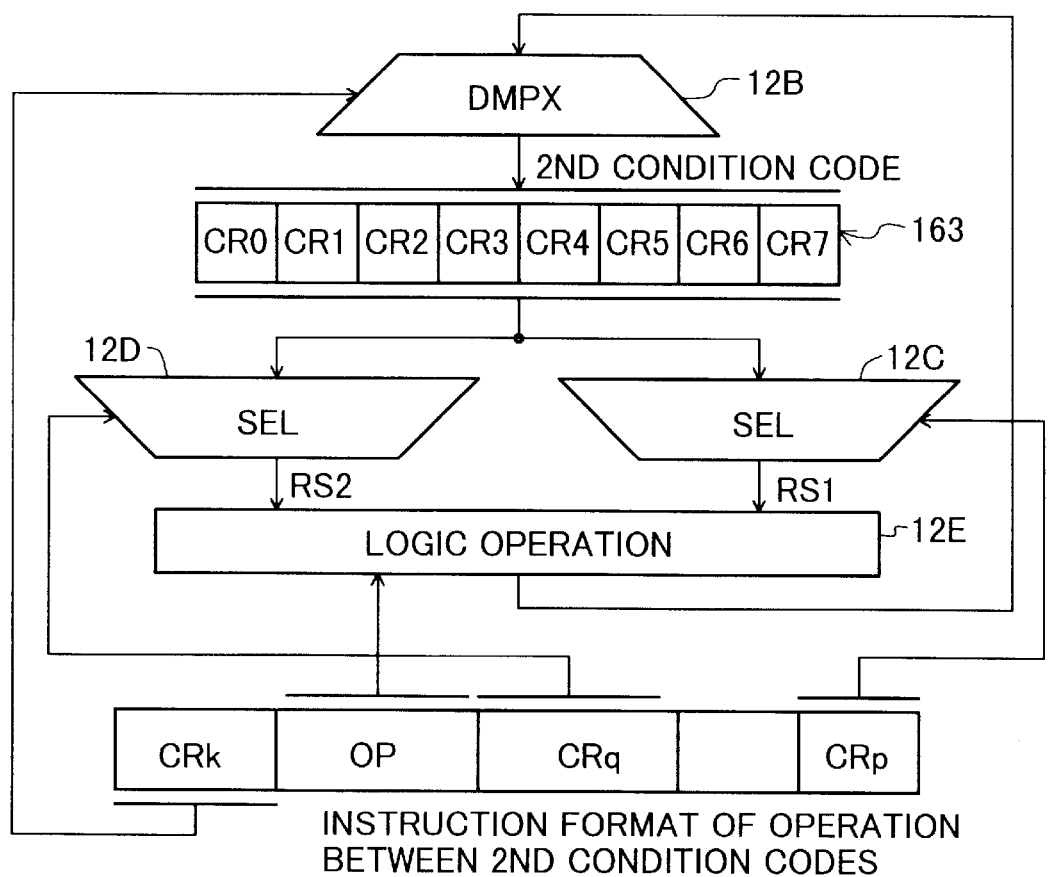
FIG. 5 is an illustration showing a relation between an instruction format of an operation between second condition codes and a schematic hardware structure for executing the instruction.

FIG. 5 shows a relation between an instruction format of operation between second condition codes and a schematic hardware structure for executing the instruction.

ID codes CRp and CRq in the instruction or decoded signals thereof are respectively provided to the control input of the selectors 12C and 12D to select two registers in the second code register file 163, and the outputs of the selectors are provided to the logic operation circuit 12E as RS1 and RS2. The logic operation circuit 12E performs one of operations shown in FIGS. 9 to 12 designated by the operation code OP in the instruction on the first source operand RS1 and the second source operand RS2, and the result thereof is provided to the demultiplexer 12B. An ID code CRk in the instruction or a decoded signal thereof is provided to the control input of the demultiplexer 12B to designate a second condition code resister in the second. condition code register file 163, and the operation's result is stored into the designated register.

In FIGS. 9 to 12, 'TRUE', 'FALSE' and 'UNDEFINED' are respectively designated as T, F and U. How the logic operations of FIGS. 9 to 12 are performed is apparent from descriptions of concrete examples that will be given below.

Figure 14:
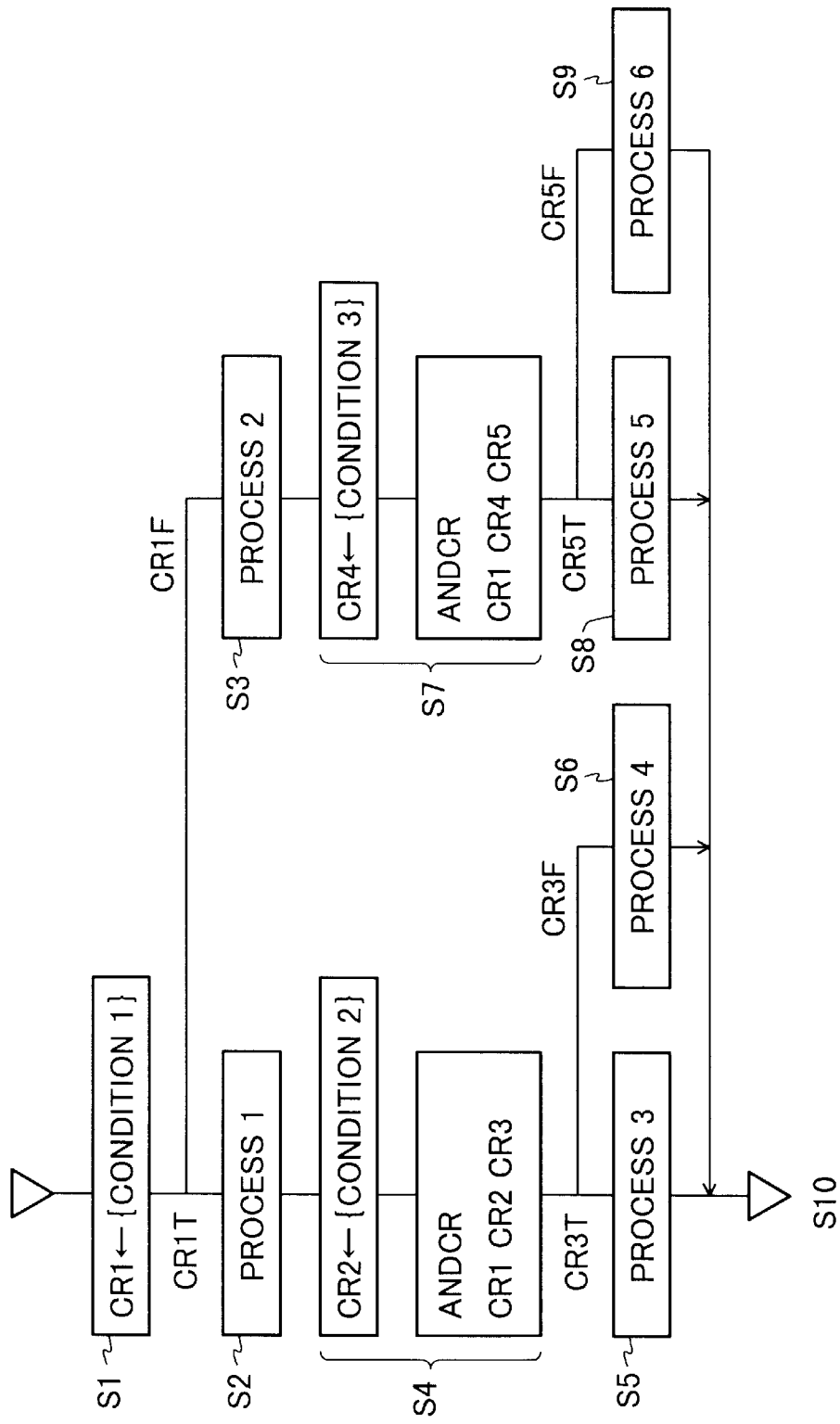
FIG. 14 is a flow chart showing the same contents as FIG. 13 by expressing the multiple conditions in FIG. 13 with using logic operations between the second codes without using a branch instruction.

FIG. 13 is a flow chart showing process divided into cases depending on conditions 1 to 3. FIG. 14 is a flow chart showing the same contents as FIG. 13 by expressing the multiple conditions in FIG. 13 with using logic operations between the second codes without using a branch instruction.

In the drawings, the head character S in S1 to S9 each denotes "Step," and the term {condition} denotes a second condition converted from a first condition code obtained by judging the condition such as R1<R2 in the brackets { }.

(S1) {condition 1} is substituted into the second condition code register CR1. If CR1T, then the process goes to S2, or else the process goes to S3.

(S2) If CR1T, then process 1 is performed. Herein, by giving the condition CR1T into the second condition instruction of FIG. 4, the process 1 can be performed without using a branch instruction. Then, the process goes to S4.

(S3) If CR1F, process 2 is performed. Herein, by giving the condition CR1F into the second condition instruction, the process 2 can be performed without using a branch instruction. Then, the process goes to S7.

(S4) {condition 2} is substituted into the second condition code register CR2.

If multiple conditions can be expressed, it is possible that more of second conditional instructions are collected into a pack and the pack is executed as 1 VLIW instruction, thus improving a parallel processing efficiency. Therefore, the multiple condition of the conditions 1 and 2 is judged by executing an instruction of operation between second condition codes of FIG. 5 on the conditions 1 and 2. Herein, a logic operation ANDCR of FIG. 9(A) is used for the judgment.

"ANDCR CR1 CR2 CR3" means executing a logic operation ANDCR between RS1=CR1 and RS2=CR2 and the storing the result thereof into the second condition code register RD=CR3.

How the operation goes is as follows:

If RS1='TRUE' and RS2='TRUE,' then RD='TRUE.'

If RS1='TRUE' and RS2='FALSE,' then RD='FALSE.'

If values of RS1 and RS2 are in combination other than the above two cases, then RD='UNDEFINED.'

Accordingly, in a case where {condition 1} is 'TRUE' and {condition 2} is 'TRUE,' CR3T is obtained and in a case where {condition 1} is 'TRUE' and {condition 2} is 'FALSE,' CR3F is obtained. In the other cases, since the second condition code register CR3 becomes 'UNDEFINED,' it is ensured that no processing in either S5 or S6 is performed.

(S5) If CR3T is obtained, process 3 is performed. Herein, by giving the condition CR3T to a second conditional instruction, the processing 3 can be performed without using a branch instruction. Then, the process goes to S10.

(S6) If CR3F is obtained, process 4 is performed. Herein, by giving the condition CR3F to a second conditional instruction, the processing 4 can be performed without using a branch instruction. Then, the process goes to S10.

When {condition 1} is 'TRUE' and {condition 2} is 'FALSE,' process 4 is performed, while to the contrary, when {condition 1} is 'FALSE' and {condition 2} is 'TRUE,' process 4 is not performed and therefore, a commutative rule is not satisfied in regard to the first source operand RS1 and the second source operand RS2. That is, a logic operation ANDCR is non-Boolean. In other words, since a commutative rule is not satisfied, it is possible to express multiple conditions.

(S7) "Condition 3" is substituted into the second condition code register CR4.

The logic operation ANDNCR of FIG. 10(A) is used to execute ANDNCR CR1 CR4 CR5 which means executing a logic operation ANDNCR between RS1=CR1 and RS2=CR4 and storing the result thereof into the second condition code register RD=CR5.

How the operation is executed is described as follows with an inversion operator "*" to convert 'TRUE' and 'FALSE' therebetween:

If *RS1='TRUE' and RS2='TRUE,' then RD='TRUE.'

If *RS1='TRUE' and RS2='FALSE,' then RD='FALSE.'

If values of RS1 and RS2 are in combination other than the above two cases, then RD='UNDEFINED.'

Accordingly, in a case where {condition 1} is 'FALSE' and {condition 2} is 'TRUE,' CR5T is obtained and in a case where {condition 1} is 'FALSE' and {condition 2} is 'FALSE,' CR5F is obtained. In the other cases, since a second condition code register CR5 becomes 'UNDEFINED,' it is ensured that processing in either S8 or S9 is not performed.

This logic operation ANDNCR is also non-Boolean.

(S8) If CR5T, then process 5 is executed. Herein, by giving the condition CR5T to a second conditional instruction, process 5 can be executed without using a branch instruction. Then, the process goes to S10.

(S9) If CR5F, then process 6 is executed. Herein, by giving the condition CR5F to a second conditional instruction, process 6 can be executed without using a branch instruction. Then, the process goes to S10.

In this way, By using an instruction of non-Boolean operation between second condition codes, processes 1 to 6 can be performed in parallel after judgments for a single condition and multiple conditions are collectively made, resulting in that a parallel processing efficiency is improved.

It should be noted that for example, when {condition 2} is R1<R2, it may be considered that the condition is replaced by R1≧R2 and 'TRUE' and 'FALSE' of the second condition code register CR2 is interchanged therebetween. In this case, when {condition 1} is 'TRUE,' process 3 is executed if {condition 2} is 'FALSE' and process 4 is executed if {condition 2} is 'TRUE.' Therefore, a logic operation NANDCR of FIG. 11(A) is used in S4.

The operation goes as follows:

If RS1='TRUE' and *RS2='TRUE,' then RD='TRUE.'

If RS1='TRUE' and *RS2='FALSE,' then RD='FALSE.'

If values of RS1 and RS2 are in combination other than the above two cases, then RD='UNDEFINED.'

Likewise, for example, when {condition 4} is R3<R4, it may be considered that the condition is replaced by R3≧R4 and 'TRUE' and 'FALSE' of the second condition code register CR4 in S7 is interchanged therebetween. In this case, when {condition 1} is 'FALSE,' process 5 is executed if {condition 3} is 'FALSE' and process 6 is executed if {condition 3} is 'TRUE.' Therefore, a logic operation NANDNCR of FIG. 12(A) is used in S7.

The operation goes as follows:

If *RS1='TRUE' and *RS2='TRUE,' then RD='TRUE.'

If *RS1='TRUE' and *RS2='FALSE,' then RD='FALSE.'

If values of RS1 and RS2 are in combination other than the above two cases, then RD='UNDEFINED.'

In addition, for example, when {condition 2} is R1<R2, it may be adopted that the condition is replaced by R1≧R2, 'TRUE' and 'FALSE' of the second condition code register CR2 in S4 is not interchanged therebetween and a logic operation NOTCR of FIG. 9(D) is performed for the second condition code register CR2.

Next, application of a logic operation ORCR and the definition thereof will be considered.

In FIG. 13, in a case where part or the whole of process 3 and part or the whole of process 5 include a common processing, the common processing is collectively executed at one block if ({condition 1} is 'TRUE' and {condition 2} is 'TRUE') or ({condition 1} is 'FALSE' and {condition 3} is 'TRUE') is 'TRUE'. Thereby the number of steps can be reduced. In FIG. 14, since in step S4, ANDCR is executed and the result thereof is stored into the second condition code register CR3, and since in step S7, ANDNCR is executed and the result thereof is stored into the second condition code register CR5, it may be adopted that a logic operation ORCR is performed between the second condition code registers CR3 and CR5 and the common processing is performed with a second condition instruction having the result of ORCR as a condition.

In order to enable such processing, the logic operation ORCR of FIG. 9(B) is defined as follows:
If at least one of RS1 and RS2 is 'TRUE,' then RD='TRUE.'
If RS1='UNDEFINED' and RS2='UNDEFINED,' then RD='UNDEFINED.'
If values of RS1 and RS2 are in combination other than the above two cases, then RD='FALSE.'

A commutative rule is satisfied in this logic operation ORCR.

Likewise, as shown in FIG. 10(B), a logic operation ORNCR is defined such that if RS1 is not 'UNDEFINED' and RS2 is 'TRUE,' then RD is equal to RD of ORCR, or else RD is equal to *RD of ORCR.

Further, as shown in FIG. 11(B), a logic operation. NORCR is defined such that RD thereof is equal to *RD of ORCR for any combination of RS1 and RS2.

Furthermore, as shown in FIG. 12(B), a logic operation NORNCR is defined such that if RS1 is 'UNDEFINED' and RS2 is not 'UNDEFINED,' then RD is equal to RD of ORNCR, or else RD is equal to *RD of ORNCR. A commutative rule is not satisfied in the logic operations ORNCR and NORNCR, and satisfied in the logic operation NORCR.

It should be noted that in a similar way to those as described above in regard to ANDCR, ANDNCR, NANDCR and NANDNCR, logic operations ORNCR, NORCR and NORNCR may be defined as below.

Firstly, application of a logic operation ORNCR is considered.

In FIG. 13, for example, in a case where part or the whole of process 4 and part or the whole of process 5 include a common processing, the common processing is executed when CR3F or CR5T is obtained in FIG. 14. In order to enable this execution collectively, a logic operation is defined in the following way:
If at least one of *RS1 and RS2 is 'TRUE,' then RD='TRUE.'
If RS1='UNDEFINED' and RS2='UNDEFINED,' then RD='UNDEFINED.'
If values of RS1 and RS2 are in combination other than the two cases, then RD='FALSE.'

A commutative rule is not satisfied in this logic operation ORNCR.

Next, application of a logic operation NORCR is considered.

In FIG. 13, for example, in a case where part or the whole of process 3 and part or the whole of process 6 include a common processing, the common processing is executed when CR3T or CR5F is obtained in FIG. 14. In order to enable this execution collectively, a logic operation NORCR of FIG. 11(B) is defined in the following way:
If at least one of RS1 and *RS2 is 'TRUE,' then RD='FALSE.'
If RS1='UNDEFINED' and RS2='UNDEFINED,' then RD='UNDEFINED.'
If values of RS1 and RS2 are in combination other than the above two cases, then RD='TRUE.'

Next, application of a logic operation NORNCR is considered.

In FIG. 13, for example, in a case where part or the whole of process 4 and part or the whole of process 6 include a common processing, the common processing is executed when CR3F or CR5F is obtained in FIG. 14. In order to enable this execution, a logic operation NORNCR is defined in the following way:
If at least one of *RS1 and *RS2 is 'TRUE,' then RD='TRUE.'
If RS1='UNDEFINED' and RS2='UNDEFINED,' then RD='UNDEFINED.'
If values of RS1 and RS2 are in combination other than the above two cases, then RD='FALSE.'

A commutative rule is satisfied in the logic operation NORNCR.

It should be noted that when a common processing is included in process 1 and process 5 or in process 3 and process 2 in FIG. 13 as well, the common processing can be executed collectively.

Likewise, as shown in FIG. 9(C), a logic operation XORCR is defined. How the operation goes is as follows:
If one of RS1 and RS2 is 'TRUE' and the other thereof is 'FALSE,' then RD='TRUE.'
If RS1 and RS2 both are 'TRUE' or 'FALSE,' then RD='FALSE.'
If values of RS1 and RS2 are in combination other than the above two cases, then RD='UNDEFINED.'

XORCR is effectively used, for example in FIG. 13, in a case where condition 2 is the same as condition 3, a common processing is executed in process 4 with a flow 'TRUE'→'FALSE' and process 5 with a flow 'FALSE'→'TRUE,' and another common processing is executed in process 3 with a flow 'TRUE'→'TRUE' and process 6 with a flow 'FALSE'→'FALSE.'

In a similar way to those as described above in regard to ANDCR, ANDNCR, NANDCR and NANDNCR, a logic operation XORNCR shown in FIG. 10(C), a logic operation NXORCR shown in FIG. 11(C) and a logic operation NXORNCR shown in FIG. 12(C) is defined.

Next, a more concrete example in which an instruction of operation between second condition codes is employed will be described.

Figure 15:
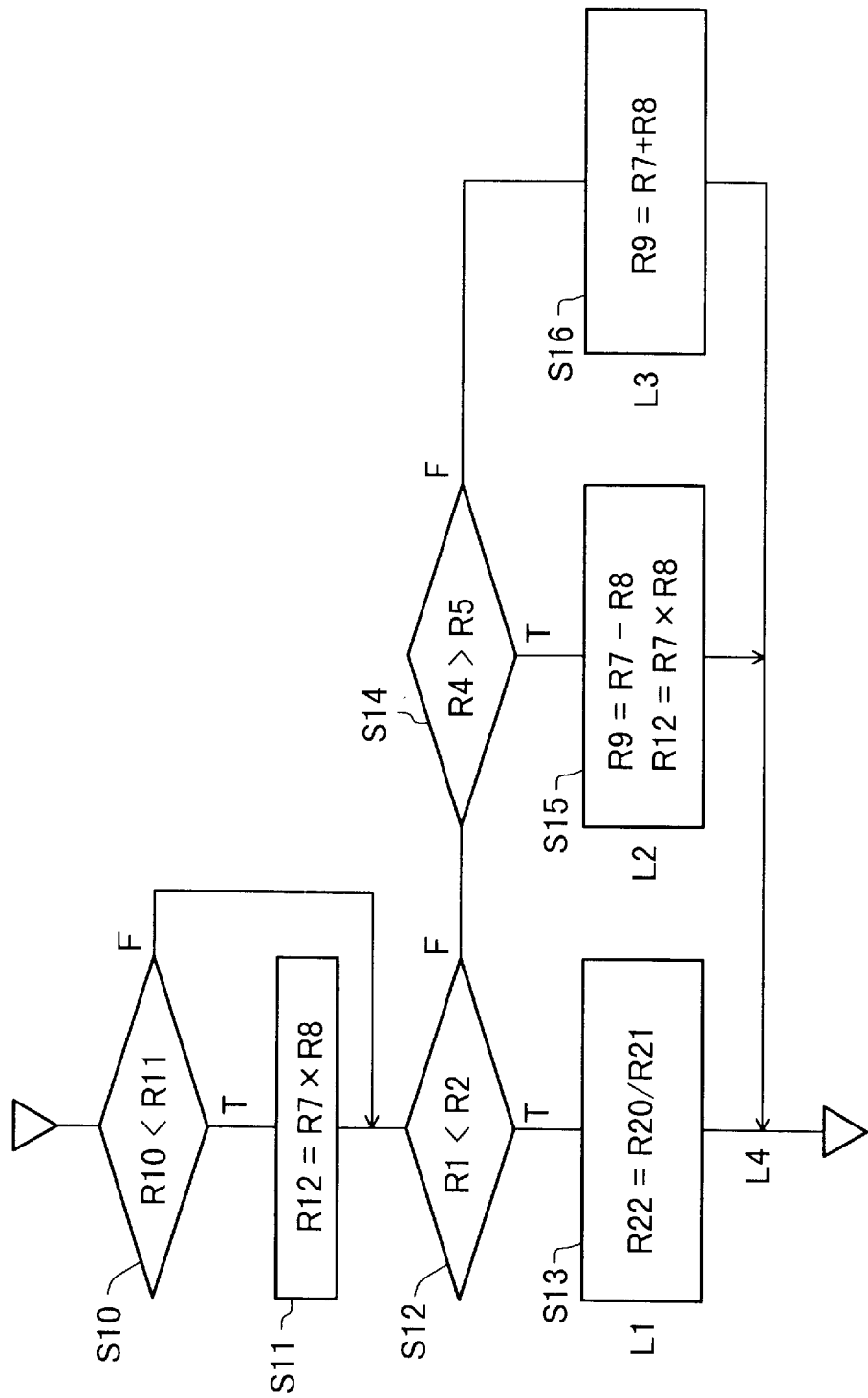
FIG. 15 is a flow chart showing a process having multiple conditions.
Figure 16:
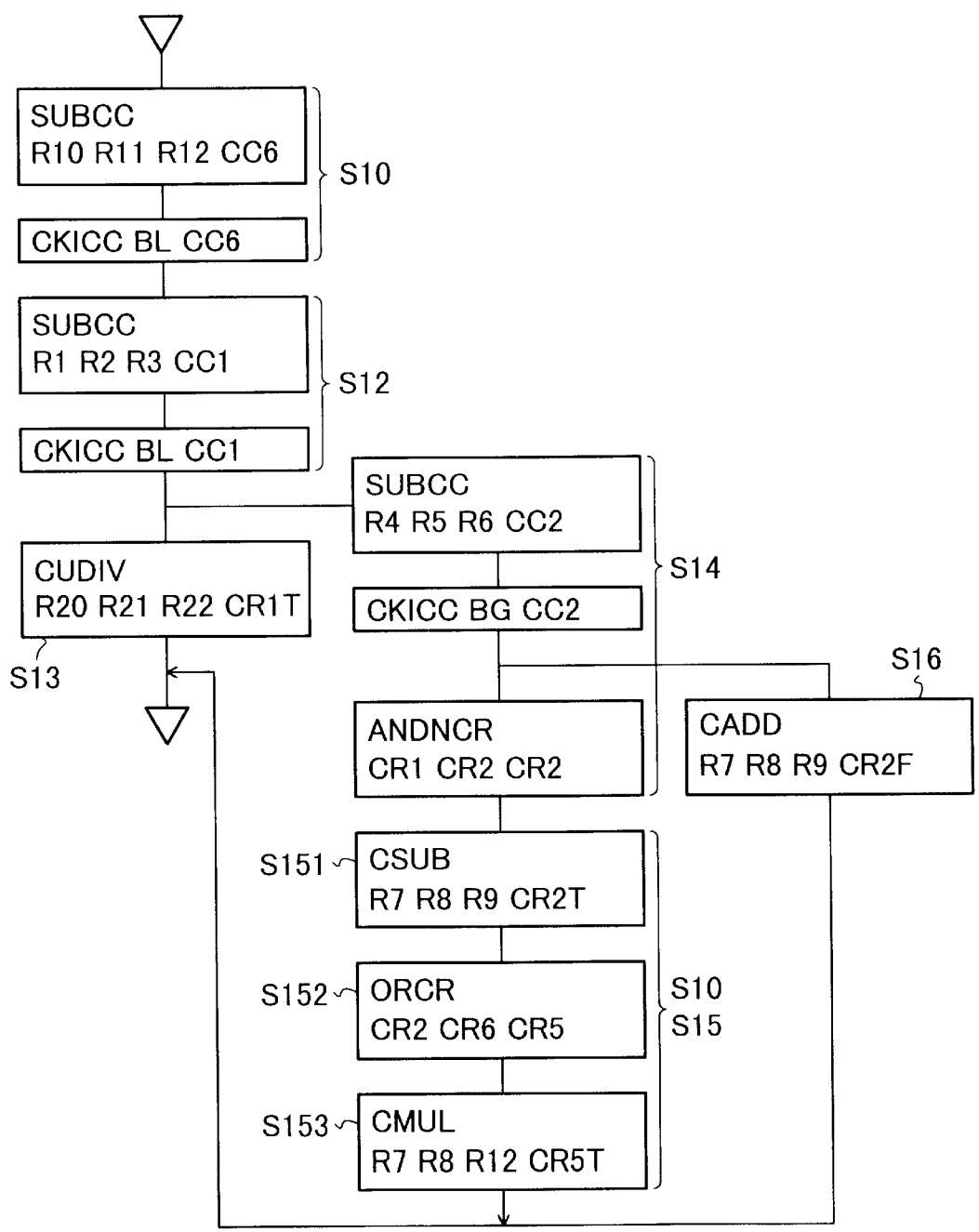
FIG. 16 is a flow chart showing the same contents as FIG. 15 by means of predicated execution without using a branch instruction.

FIG. 15 is a flow chart showing process having multiple conditions. FIG. 16 is a flow chart showing the same contents as FIG. 15 by means of predicated execution without using a branch instruction.

Since the common processing R12=R7×R8 is executed in S11 and S15, it is executed collectively at one block as described above.

(S10) It is judged whether or not R10<R11. If the result is 'TRUE,' then the process goes to S11, while if the result is 'FALSE,' then the process goes to S12.

This processing is performed with the following two instructions.

[1] SUBCC R10 R11 R12 CC6

This instruction means performing (R10−R11), storing the result thereof into the general register R12, and setting N='1' if the result is negative, Z='1' if the result is zero, or C='1' if there arises a borrow, in the first condition code register CC6.

[2] CKICC BL CC6

This instruction means performing the logic operation of (N xor OV) for the first condition code register CC6 and storing the result of the operation into the second code register CR6.

(S12) It is judged whether or not R1<R2. If the result is 'TRUE,' then the process goes to S13, while if the result is 'FALSE,' then the process goes to S14.

This processing is performed with the following two instructions:

[3] SUBCC R1 R2 R3 CC1

This instruction means performing (R1–R2), storing the result thereof into the general register R3, and setting N='1' if the result is negative, Z='1' if the result is zero, or C='1' if there arises a borrow, in the first condition code register CC1.

[4] CKICC BL CC1

This instruction means performing the logic operation of (N xor OV) for the first condition code register CC1 and storing the result of the operation into the second code register CR1.

(S13) A division R20/R21 is performed and the result is stored into R22.

[5] CUDIV R20 R21 R22 CR1T

The character U in CUDIV means that the logic operation is an operation on unsigned numbers.

This instruction means, in the case of CR1T, performing R20/R21 and storing the result thereof into the general register R22.

(S14) It is judged whether or not R4>R5. If the result is 'TRUE,' then the process goes to step S15, while the result is 'FALSE,' then the process goes to S16.

Since the processing requires the judgment on double conditions without using a branch instruction, the processing is performed with the following three instructions.

[6] SUBCC R4 R5 R6 CC2

This instruction means performing (R4–R5), storing the result thereof into the general register R6, and setting N='1' if the result is negative, Z='1' if the result is zero, or C='1' if there arises a borrow, in the first condition code register CC2.

[7] CKICC BG CC2

This instruction means performing the logic operation of not (Z or (N xor OV)) for the first condition code register CC2 and storing the result of the operation into the second code register CR2.

[8] ANDNCR CR1 CR2 CR2

This instruction means executing the logic operation ANDNCR for CR1 and CR2 and storing the result thereof into the second condition code register CR2.

(S15) A subtraction (R7–R8) is performed and the result is stored into the general register R9.

[9] CSUB R7 R8 R9 CR2T

This instruction means, in the case of CR2T, performing (R7–R8) and storing the result thereof into the general register R9.

Then, a multiplication (R7×R8) is performed and the result is stored into a general register R12.

Since steps S11 and S15 have the common processing to be collectively executed, this processing is executed with the following two instructions:

[10] ORCR CR2 CR6 CR5

This instruction means executing the logic operation ORCR for the second condition code registers CR2 and CR6 and storing the result thereof into the second condition code register CR5.

[11] CMUL R7 R8 R12 CR5T

This instruction means, in the case of CR5T, performing (R7 ×R8) and storing the result thereof into the general register R12.

(S16) An addition (R7+R8) is performed and the result is stored into the general resister R9.

[12] CADD R7 R8 R9 CR2F

This instruction means, in the case of CR2F, performing (R7+R8) and storing the result thereof into the general register R9.

FIG. 17 shows an instruction sequence which are obtained by converting the above described instructions [1] to [12] into instruction packets using an instruction scheduler in order that the instructions [1] to [12] are executed on a 4 parallel VLIW processor.

FIG. 18 shows an instruction sequence which are obtained by converting a program, which performs the same contents as FIG. 15 with a prior art instruction set including a branch instruction, into instruction packets using an instruction scheduler in order that the program is executed on a 4 parallel VLIW processor.

In the case of FIG. 17, a parallel processing efficiency is increased by a factor of two compared with the case of FIG. 18 with decreasing in the number of NOP instructions, and a processing speed is faster by about twice.

Figure 19:
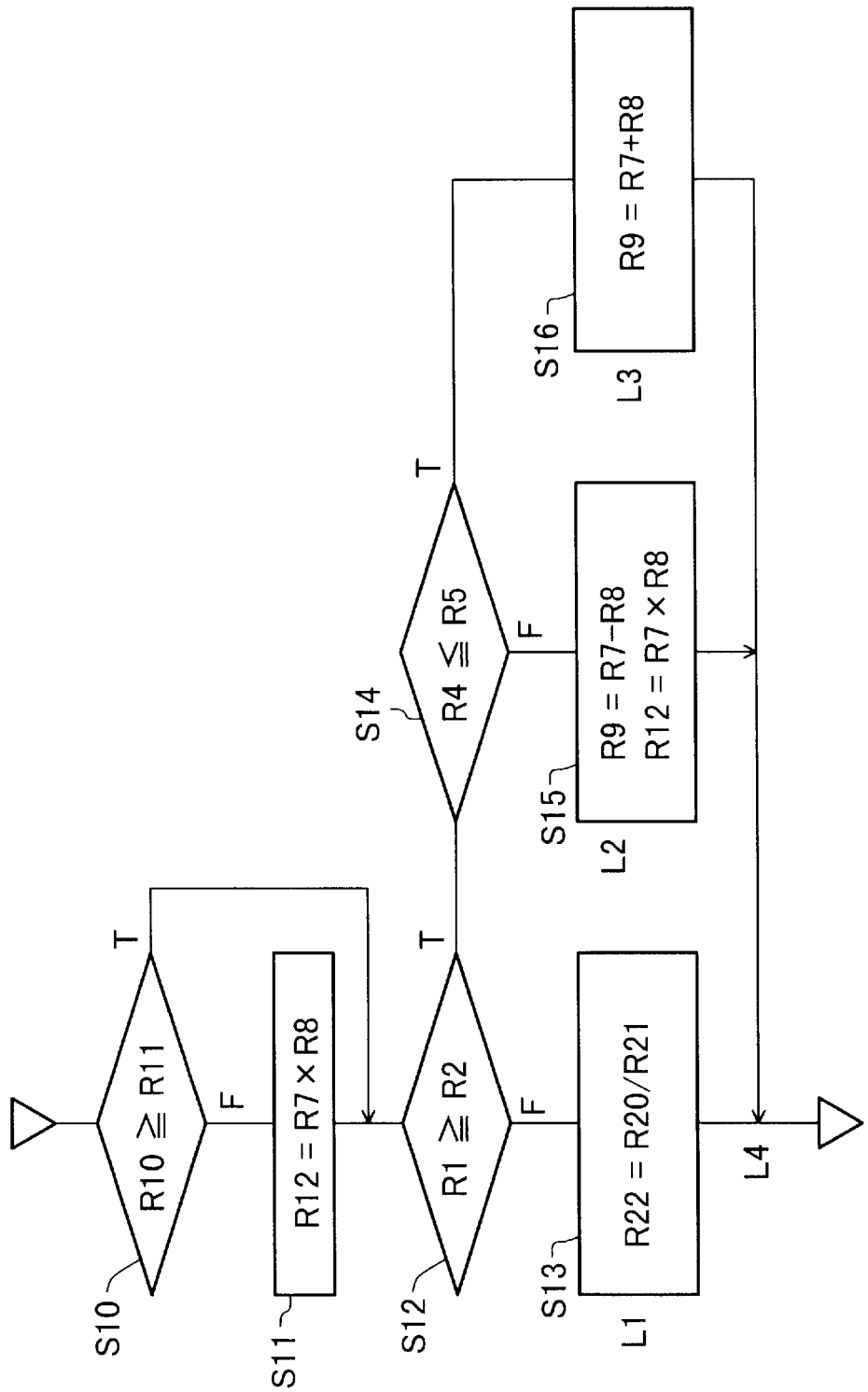
FIG. 19 is a flow chart showing the same contents as FIG. 15 performed by reversing the conditions and their results of 'true' and 'false;'

FIG. 19 is a flow chart when processing having the same contents as those of FIG. 15 is performed with relations of the conditions and the results of 'TRUE' and 'FALSE' being reversed.

Figure 20:
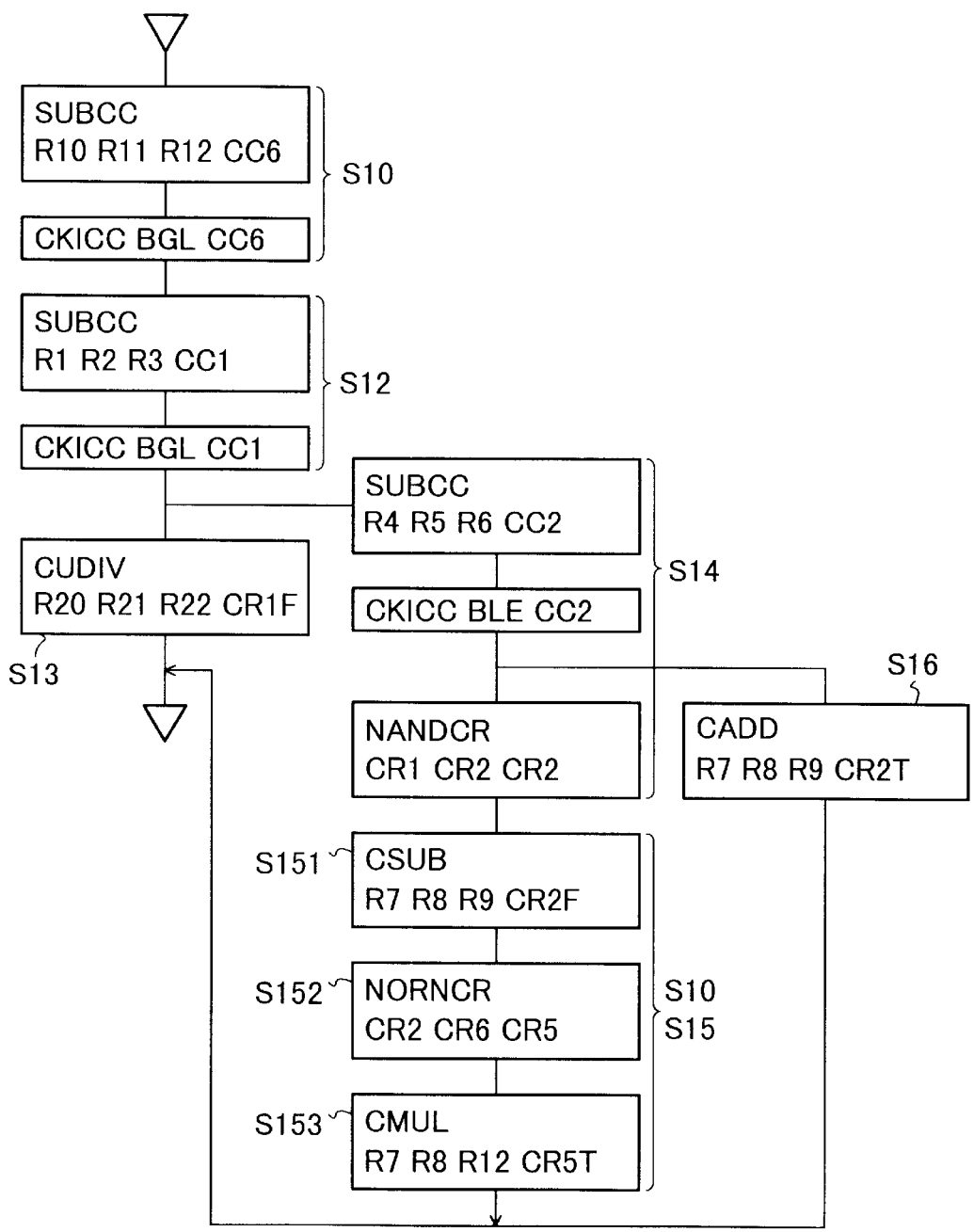
FIG. 20 is a flow chart showing the same contents as FIG. 19 performed using predicated execution without using a branch instruction.

FIG. 20 is a flow chart showing the same contents as FIG. 19 performed using predicated execution without using a branch instruction.

Comparing of FIG. 20 with FIG. 16, the condition field of a condition code conversion instruction is altered in the following way: That is, BL is replaced with BGL in S10, BL is replaced with BGL in S12, and BG is replaced with BLE in S14.

Further, an instruction of operation between second condition codes is altered in the following way: That is, ANDNCR is replaced with NANDCR in S14 and ORCR is replaced with NORNCR in S152.

Still further, a second conditional instruction is altered in the following way. That is, CR1T is replaced with CR1F in S13, CR2T is replaced with CR2F in S151, and CR2F is replaced with CR2T in S16.

The present invention is applicable not only to a VLIW processor but also to any other information processor for processing information or data.

What is claimed is:

1. An information processor comprising:

an instruction register for storing a fetched instruction, said instruction being one of instructions including an operational instruction with a function of generating a first condition code, a condition code conversion instruction having a reference condition code, a conditional instruction having a reference flag;

an instruction decoder for decoding an instruction stored in said instruction register;

a control circuit for performing a control to execute said stored instruction in response to a decoded result;

a first condition code register;

a second condition code register; and a condition code conversion circuit for converting contents of said first condition code register into a second condition code depending on said reference condition code, said second condition code having a condition flag, wherein said control circuit makes said generated first condition code stored into said first condition code register in response to a decoded result of said operational instruction, makes said converted second condition code stored into said second condition code register in response to a decoded result of said condition code conversion instruction, and performs a control to execute an operation of said conditional instruction in response to a decoded result of said conditional instruction only when said reference flag coincide with said condition flag in said second condition code register.

2. An information processor according to claim 1, wherein said second condition code further has a valid flag indicating 'VALID' or 'INVALID' and constituting a pair with said reference flag, and said control circuit makes said valid flag in said second condition code register 'VALID' in response to said decoded result of said condition code conversion instruction, and does not perform a control to execute an operation of said conditional instruction in response to said decoded result of said conditional instruction regardless of a value of said condition flag when said valid flag indicates 'INVALID.'

3. An information processor according to claim 2, wherein a plurality of said first condition code registers are provided and said condition code conversion instruction further has a first identification code, said information processor further comprising a first selector for selecting one of said first condition code registers in response to said first identification code, and for providing contents of said selected one to said condition code conversion circuit.

4. An information processor according to claim 3, wherein a plurality of said second condition code registers are provided and each of said condition code conversion instruction and said conditional instruction further has a second identification code, said information processor further comprising:
a demultiplexer for selecting one of said second condition code registers in response to said second identification code in said condition code conversion circuit, and for providing said converted second condition code to said selected one of said second condition code registers; and
a second selector for selecting one of said second condition code registers in response to said second identification code in said conditional instruction, and for providing contents of said selected one thereof to said control circuit,
wherein, in executing said conditional instruction, said control circuit uses said provided contents.

5. An information processor according to claim 4, wherein said instruction decoder decodes an instruction of operation between two of said second condition code registers, said instruction thereof having an operation code for designating a kind of logic operation, first and second source operand codes for designating two of said second condition code registers, and a destination operand code for designating one of said second condition code registers into which a result of said logic operation is stored, said information processor further comprising a logic operation circuit for performing a logic operation designated by said operation code.

6. An information processor according to claim 5, wherein said second selector selects first one of said second condition code registers in response to said first source operand code and provides contents of said first one to said logic operation circuit, said information processor further comprising a third selector for selecting a second one of said second condition code registers in response to said second source operand code, and for providing contents of said second one to said logic operation circuit.

7. An information processor according to claim 6, wherein said demultiplexer selects a third one of said second condition code registers in response to said destination operand code and provides a result of said logic operation to said selected third one.

8. An information processor according to claim 5, wherein said logic operation circuit performs such a non-Boolean ANDCR operation that:

letting RS1, RS2 and RD be said second condition code registers designated by said first and second source operand codes and said destination operand code, respectively, letting V and S be said valid flag and said condition flag, respectively, and defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), If RS1='TRUE' and RS2='TRUE,' then RD='TRUE;'

If RS1='TRUE' and RS2='FALSE,' then RD='FALSE;' and

If values of RS1 and RS2 are in combination other than said two cases, then RD='UNDEFINED.'

9. An information processor according to claim 5, wherein said logic operation circuit performs such a non-Boolean ANDNCR operation that:

letting RS1, RS2 and RD be said second condition code registers designated by said first and second source operand codes and said destination operand code, respectively, letting V and S be said valid flag and said condition flag, respectively, defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), and defining an inversion operator "*" to convert 'TRUE' and 'FALSE' therebetween, If *RS1='TRUE' and RS2='TRUE,' then RD='TRUE;'

If *RS1='TRUE' and RS2='FALSE,' then RD='FALSE;' and

If values of RS1 and RS2 are in combination other than said two cases, then RD='UNDEFINED.'

10. An information processor according to claim 5, wherein said logic operation circuit performs such a non-Boolean NANDCR operation that:

letting RS1, RS2 and RD be said second condition code registers designated by said first and second source operand codes and said destination operand code, respectively, letting V and S be said valid flag and said condition flag, respectively, defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), and defining an inversion operator "*" to convert 'TRUE' and 'FALSE' therebetween, If RS1='TRUE' and *RS2='TRUE,' then RD='TRUE;'

If RS1='TRUE' and *RS2='FALSE,' then RD='FALSE;' and

If values of RS1 and RS2 are in combination other than said two cases, then RD='UNDEFINED.'

11. An information processor according to claim 5, wherein said logic operation circuit performs such a non-Boolean NANDNCR operation that:

letting RS1, RS2 and RD be said second condition code registers designated by said first and second source operand codes and said destination operand code, respectively, letting V and S be said valid flag and said condition flag, respectively, defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), and defining an inversion operator "*" to convert 'TRUE' and 'FALSE' therebetween, If *RS1='TRUE' and *RS2='TRUE,' then RD='TRUE;'

If *RS1='TRUE' and *RS2='FALSE,' then RD='FALSE;' and

If values of RS1 and RS2 are in combination other than said two cases, then RD='UNDEFINED.'

12. An information processor according to claim 5, wherein said logic operation circuit performs such an ORCR operation that:

letting RS1, RS2 and RD be said second condition code registers designated by said first and second source operand codes and said destination operand code, respectively, letting V and S be said valid flag and said condition flag, respectively, and defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), If at least one of RS1 and RS2 is 'TRUE,' then RD='TRUE,'

If RS1='UNDEFINED' and RS2='UNDEFINED,' then RD='UNDEFINED,' and

If values of RS1 and RS2 are in combination other than said two cases, then RD='UNDEFINED.'

13. An information processor according to claim 5, wherein said logic operation circuit performs such a non-Boolean ORNCR operation that:

letting RS1, RS2 and RD be said second condition code registers designated by said first and second source operand codes and said destination operand code, respectively, letting V and S be said valid flag and said condition flag, respectively, defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), and defining an inversion operator "*" to convert 'TRUE' and 'FALSE' therebetween, If at least one of *RS1 and RS2 is 'TRUE,' then RD='TRUE,'

If RS1='UNDEFINED' and RS2='UNDEFINED,' then RD='UNDEFINED,' and

If values of RS1 and RS2 are in combination other than said two cases, then RD='UNDEFINED.'

14. An information processor according to claim 5, wherein said logic operation circuit performs such a non-Boolean NORCR operation that:

letting RS1, RS2 and RD be said second condition code registers designated by said first and second source operand codes and said destination operand code, respectively, letting V and S be said valid flag and said condition flag, respectively, and defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), If at least one of RS1 and RS2 is 'TRUE,' then RD='FALSE,'

If RS1='UNDEFINED' and RS2='UNDEFINED,' then RD='UNDEFINED,' and

If values of RS1 and RS2 are in combination other than said two cases, then RD='TRUE.'

15. An information processor according to claim 5, wherein said logic operation circuit performs such a NORNCR operation that:

letting RS1, RS2 and RD be said second condition code registers designated by said first and second source operand codes and said destination operand code, respectively, letting V and S be said valid flag and said condition flag, respectively, defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), and defining an inversion operator "*" to convert 'TRUE' and 'FALSE' therebetween, If at least one of *RS1 and RS2 is 'TRUE,' then RD='FALSE,'

If RS1='UNDEFINED' and RS2='UNDEFINED,' then RD='UNDEFINED,' and

If values of RS1 and RS2 are in combination other than said two cases, then RD='TRUE.'

16. An information processor according to claim 5, wherein said logic operation circuit performs such an XORCR operation that:

letting RS1, RS2 and RD be said second condition code registers designated by said first and second source operand codes and said destination operand code, respectively, letting V and S be said valid flag and said condition flag, respectively, and defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), If one of RS1 and RS2 is 'TRUE' and the other thereof is 'FALSE,' then RD='TRUE.'

If RS1 and RS2 both are 'TRUE' or 'FALSE,' then RD='FALSE.'

If values of RS1 and RS2 are in combination other than said two cases, then RD='UNDEFINED.'

17. An information processor according to claim 5, wherein said logic operation circuit performs such an XORNCR operation that:

letting RS1, RS2 and RD be said second condition code registers designated by said first and second source operand codes and said destination operand code, respectively, letting V and S be said valid flag and said condition flag, respectively, and defining (V, S)='TRUE' if (V, S)=('VALID', 'TRUE'), (V, S) is 'FALSE' if (V, S)=('VALID', 'FALSE'), and (V, S) is 'UNDEFINED' if (V, S)=('INVALID', 'TRUE') or (V, S)=('INVALID', 'FALSE'), If one of RS1 and RS2 is 'TRUE' and the other thereof is 'FALSE,' then RD='FALSE.'

If RS1 and RS2 both are 'TRUE' or 'FALSE,' then RD='TRUE.'

If values of RS1 and RS2 are in combination other than said two cases, then RD='UNDEFINED.'

* * * * *